(12) United States Patent
Acquaviva et al.

(10) Patent No.: US 8,222,856 B2
(45) Date of Patent: Jul. 17, 2012

(54) CONTROL SYSTEM WITHOUT POSITION SENSORS FOR A SYNCHRONOUS ELECTRIC MOTOR

(75) Inventors: Sebastiano Acquaviva, Pino Torinese (IT); Piergiorgio Ricco, Turin (IT)

(73) Assignee: Askoll P&C S.r.l. (IT)

( * ) Notice: Subject to any disclaimer, the term of this patent is extended or adjusted under 35 U.S.C. 154(b) by 375 days.

(21) Appl. No.: 12/666,665

(22) PCT Filed: Jun. 24, 2008

(86) PCT No.: PCT/IB2008/052501
§ 371 (c)(1),
(2), (4) Date: Feb. 25, 2010

(87) PCT Pub. No.: WO2009/001291
PCT Pub. Date: Dec. 31, 2008

(65) Prior Publication Data
US 2010/0188037 A1 Jul. 29, 2010

(30) Foreign Application Priority Data

Jun. 26, 2007 (IT) .............................. TO2007A0459

(51) Int. Cl.
*H02P 1/46* (2006.01)
(52) U.S. Cl. ........ 318/721; 318/700; 318/722; 318/723; 318/724; 318/430
(58) Field of Classification Search .................. 318/721, 318/700, 722–724, 430
See application file for complete search history.

(56) References Cited

U.S. PATENT DOCUMENTS

| | | | |
|---|---|---|---|
| 5,343,127 A * | 8/1994 | Maiocchi | 318/400.11 |
| 6,239,563 B1 | 5/2001 | Kunz | |
| 2003/0230999 A1 | 12/2003 | de Nanclares et al. | |

FOREIGN PATENT DOCUMENTS

| | | |
|---|---|---|
| DE | 19820929 A1 | 11/1999 |
| EP | 0207430 A2 | 1/1987 |
| EP | 0851570 A1 | 7/1998 |
| EP | 0909013 A2 | 4/1999 |
| EP | 0945973 A2 | 9/1999 |
| FR | 2653613 A1 | 4/1991 |

* cited by examiner

*Primary Examiner* — Walter Benson
*Assistant Examiner* — David Luo
(74) *Attorney, Agent, or Firm* — Akerman Senterfitt

(57) ABSTRACT

A control system for a motor, including a first detector providing signals indicative of the sign and zero-crossings of a supply voltage, and a second detector providing signals indicative of the sign and the zero-crossings of BEMF developed in the stator winding. A switch is driven to cause a first current pulse through the winding at a first delay relative to the zero-crossing of the supply voltage. The system checks if the BEMF has a first zero-crossing within a predetermined period of time preceding a third zero-crossing of the voltage, and if so, causes an opposite second current pulse through the winding with a second delay relative to the third zero-crossing of the supply. If not, the first current pulse is repeated, reducing or increasing the duration of the first delay if the first zero-crossing of the BEMF took place after or before the predetermined period of time.

11 Claims, 5 Drawing Sheets

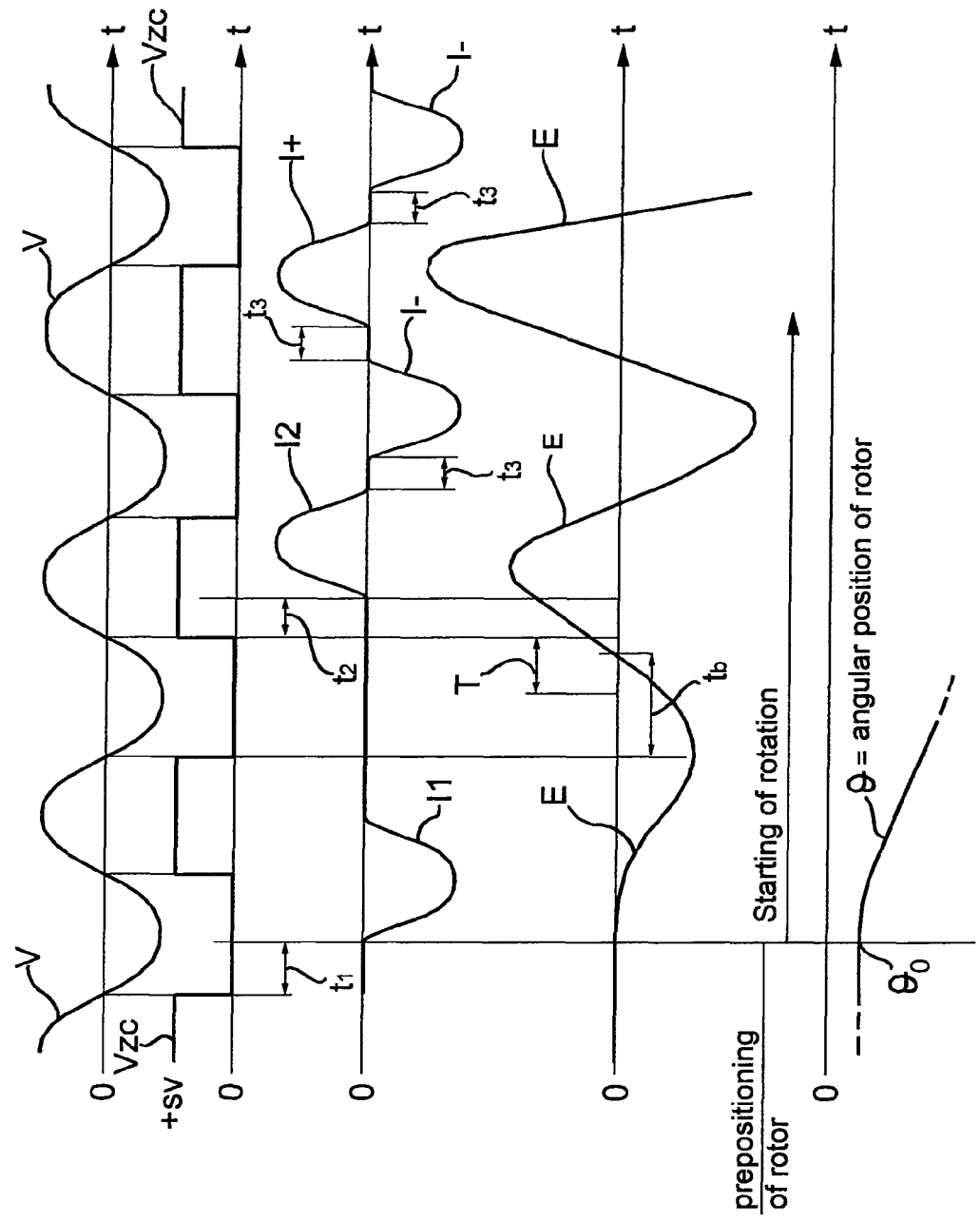

CONTROL SYSTEM WITHOUT POSITION SENSORS FOR A SYNCHRONOUS ELECTRIC MOTOR

The present invention relates to a system, without position sensors, for controlling the rotation of the rotor of a synchronous electric motor.

An object of the present invention is to provide a control system of this type which is simple and inexpensive to produce and which is reliable in operation.

This and other objects are achieved, according to the invention, by a control system without position sensors for a synchronous, rotary electric motor the main characteristics of which are defined in Claim 1.

Figure 1:
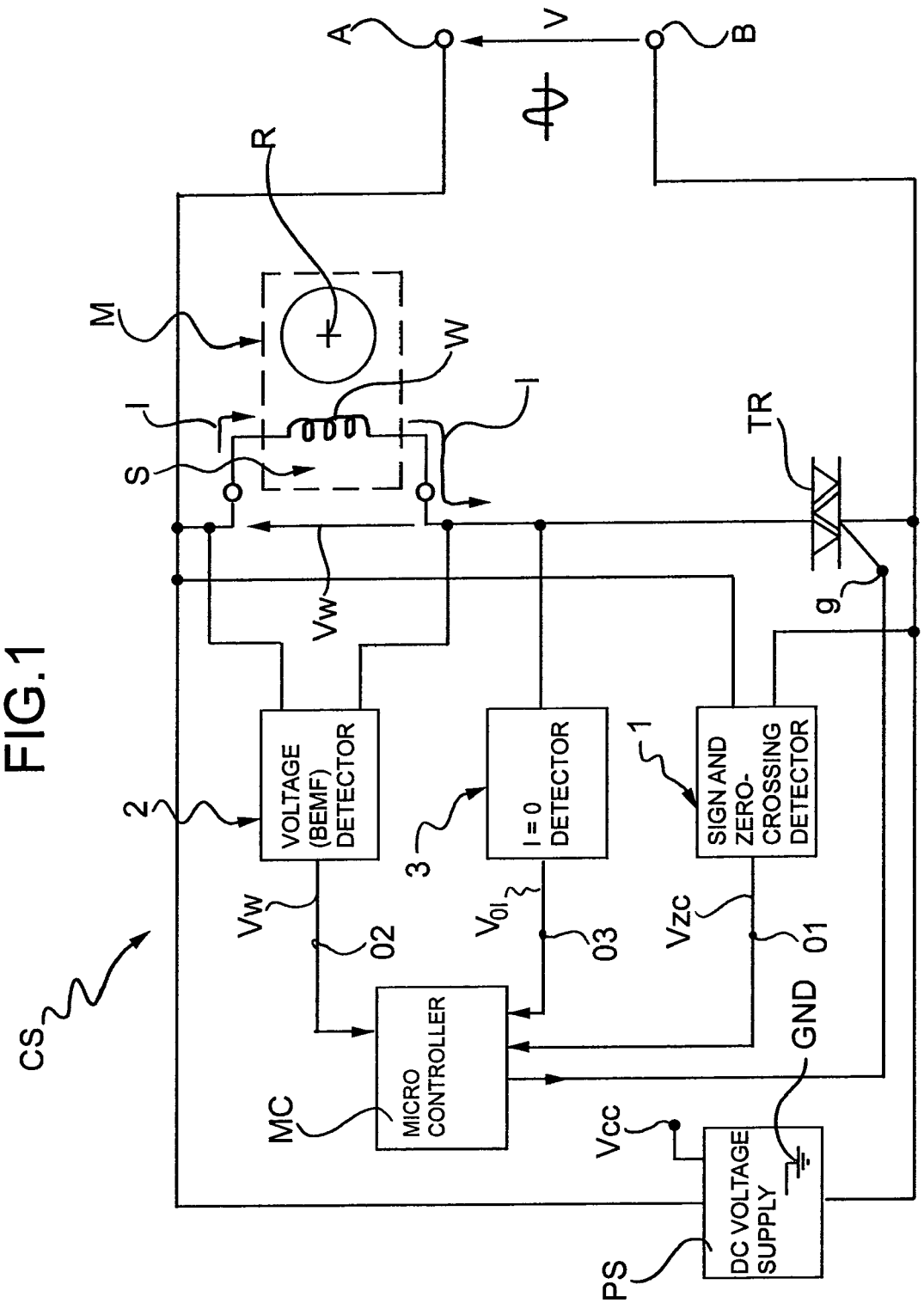
Figure 2:
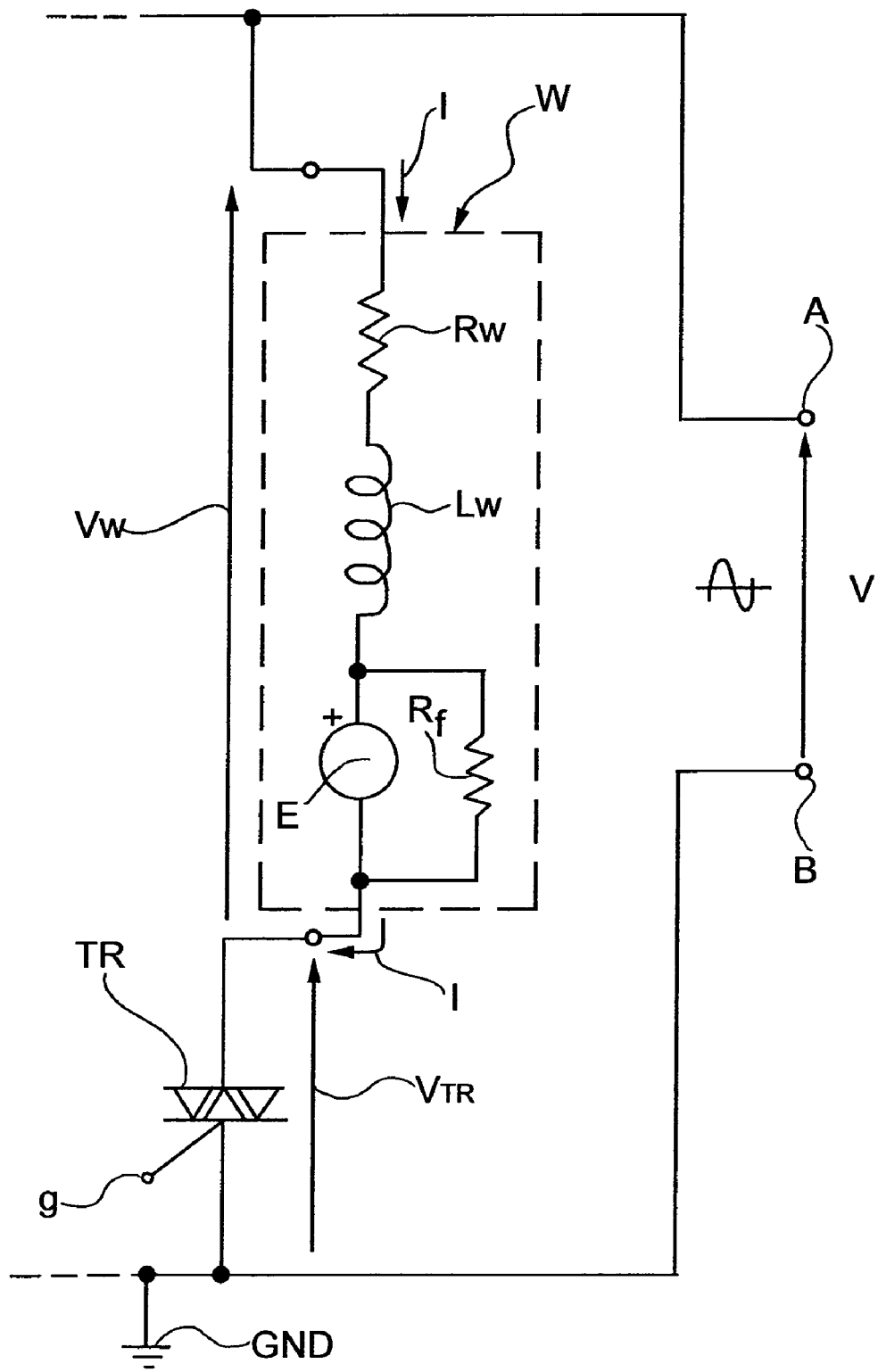
Figure 3:
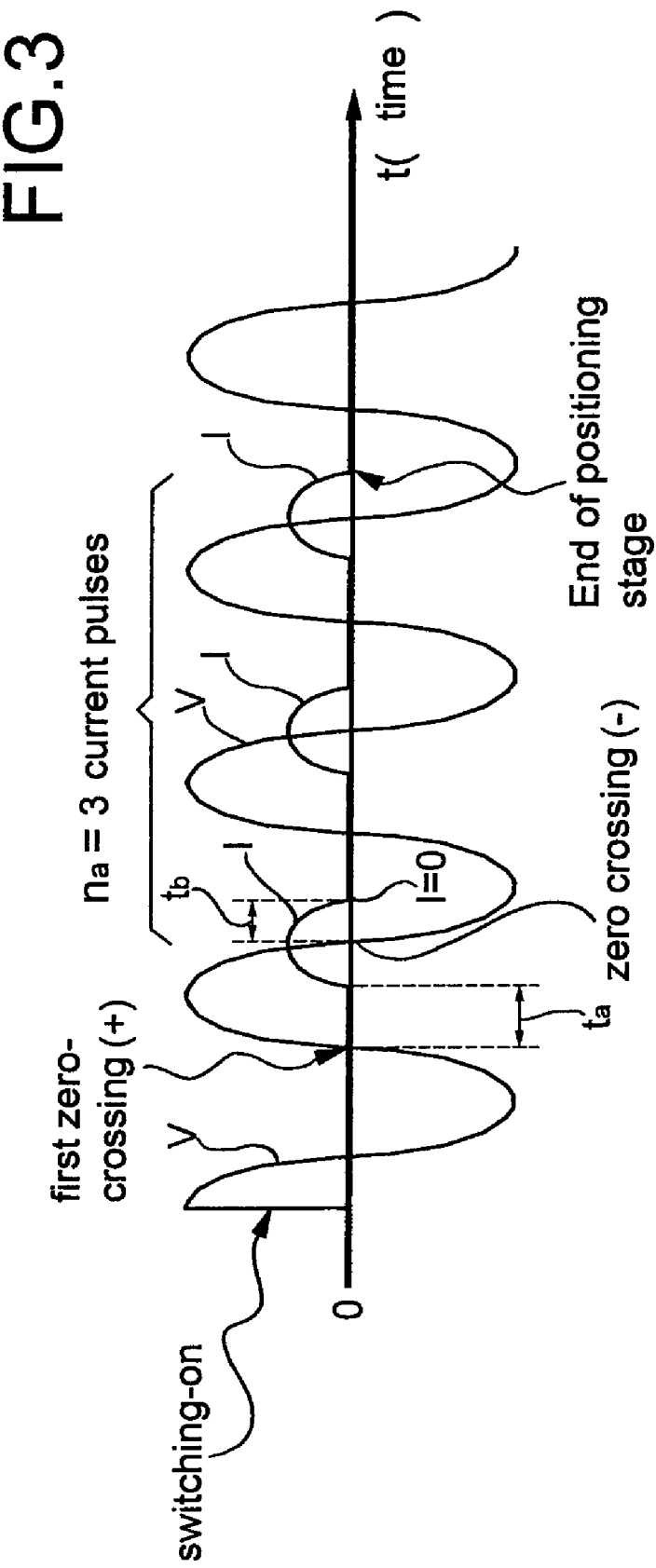
Figure 4:
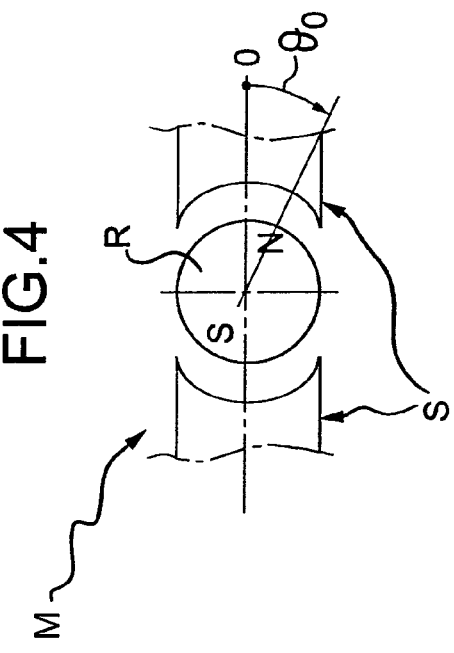
Figure 5:
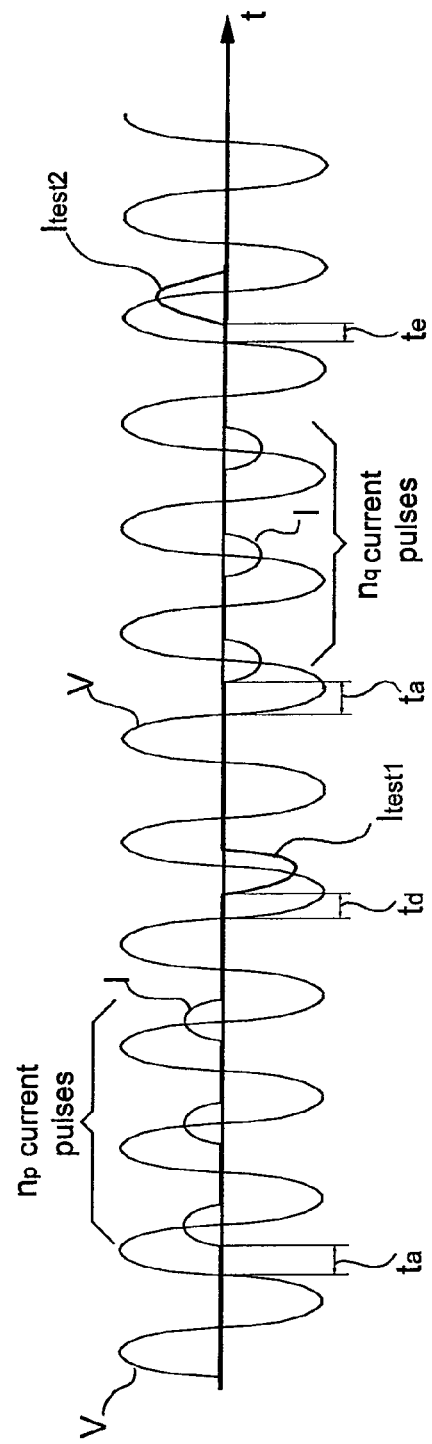

Further characteristics and advantages of the invention will become clear from the following detailed description which is given purely by way of non-limiting example with reference to the appended drawings, in which:

FIG. 1 is an electrical diagram, partially in block form, of a control system for a synchronous electric motor according to the present invention, FIG. 2 is a partial view of the control system of the motor showing clearly a circuit equivalent to the stator winding, FIG. 3 is a graph showing examples of curves of electrical quantities in the system of FIG. 1 during a stage of initial positioning of the rotor of the motor, FIG. 4 shows schematically an initial position of the rotor of the motor, FIG. 5 is a graph which shows another example of a curve of the current in the motor of FIG. 1 in an initial stage of movement of the rotor, and FIG. 6 is a series of graphs which show curves of electrical and mechanical quantities and of signals developed during the stage of the starting of the rotation of the motor under the control of the control system according to the invention.

A synchronous electric motor, for example, a motor for a dishwasher pump, is generally indicated M in FIG. 1.

The motor M comprises a rotor R with permanent magnets and a stator S including a winding W.

Structurally, the motor M may be of the type illustrated and described, for example, in European patent application EP 0 207 430 A1 or in European patent EP 0 851 570 B1.

A control system, generally indicated CS, is associated with the motor M. In particular, the system has no position sensors associated with the rotor R of the motor M.

The control system CS comprises an electronic switch which, in the embodiment shown, is a triac TR which is connected in series with the winding W of the motor M between two terminals A and B that are intended to be connected to an alternating-current voltage supply V such as the normal 50 (60) Hz electricity distribution grid.

The triac TR has its gate G connected to an output of a microcontroller MC.

The control system CS further comprises a first detector circuit 1 suitable for supplying to the microcontroller MC a signal indicative of the sign and of the zero-crossings of the supply voltage V. The sign of the supply voltage means its polarity which is assumed conventionally to be positive when the terminal A is at a higher potential than the terminal B.

FIG. 6 shows, in the upper graph, the curve of the supply voltage V and, in the graph immediately below it, the corresponding curve of the signal $V_{ZC}$ supplied by the detector circuit 1. Briefly, when $V_{ZC}$ is at "high" level (+5V), the supply voltage V is positive. Moreover, the transitions of $V_{ZC}$ from "high" level to "low" level (0V) and vice versa correspond to the zero-crossings of the supply voltage V.

The control system CS may also comprise a second detector circuit, indicated 2. This circuit is a voltage detector and has its input connected to the terminals of the stator winding W and its output connected to the microcontroller MC.

As will become clearer from the following description, in certain operating conditions, the voltage at the terminals of the stator winding W of the motor M is representative of the intensity of the back electromotive force (BEMF) developed in that winding whereas, in other conditions, the voltage corresponds to the supply voltage V.

The control system CS further comprises a third detector circuit 3 having its input connected between the stator winding W and the triac TR and its output connected to the microcontroller MC. This detector can supply a signal indicative of when the current I operatively flowing in the stator winding W is zero.

The detector circuits 1, 2 and 3 may optionally be partially or wholly integrated in the microcontroller MC.

Finally, a direct-current power supply, indicated PS in FIG. 1, is connected between the supply terminals A and B in order to render a direct-current supply voltage $V_{CC}$ operatively available. The power supply PS creates internally an earth reference GND for the control system CS.

The microcontroller MC is arranged to drive the triac TR in a manner such that, when the motor M is operating in the steady running state, the triac TR is made conductive only when the sign or direction of the current I flowing in the winding W and the sign or polarity of the back electromotive force developed in the winding W are such as to satisfy a predetermined relationship.

In particular, upon the assumption that the current I is positive when it flows in the direction indicated by the arrows in FIGS. 1 and 2, and upon the assumption that the sign of the back electromotive force E is positive when its positive polarity is directed towards the supply terminal A, the control performed by the microcontroller MC is such that the triac TR is made conductive in a manner such that the sign of the current I is the same as the sign of the back electromotive force E, that is that, simultaneously:

$$I>0 \text{ and } E>0, \text{ or } I<0 \text{ and } E<0 \tag{1}$$

In FIG. 2, the winding W is represented by its equivalent circuit (Thevenin equivalent circuit). In this representation, $R_W$ and $L_W$ represent the resistance and the inductance of the winding W, E represents the back-electromotive force developed in the winding, and $R_F$ represents the resistance due to the losses in the magnetic circuit associated with the stator winding W.

With reference to FIG. 2, if $V_W$ indicates the voltage at the terminals of the stator winding W (which voltage is applied to the input of the detector circuit 2 of FIG. 1) and $V_{TR}$ indicates the voltage at the terminals of the triac TR (which is considered to be positive when its positive polarity is directed towards the terminal A), we have:

$$V_W = V - V_{TR} = R_W I + L_W dI/dt + E \tag{2}$$

It can be seen from equation (2) given above that, when the triac TR is not conductive and the current I in the motor M is therefore zero (I=0), we have:

$$V_W = E = V - V_{TR} \tag{3}$$

that is, the voltage $V_W$ acquired in this situation by the microcontroller MC by means of the detector circuit 2 represents the intensity of the back-electromotive force E. When, on the other hand, the triac TR is conductive, the voltage $V_W$ corresponds substantially to the supply voltage V.

The control system CS can therefore be arranged to acquire the electromotive force E, for example, in the following manner: the detector circuit 3 indicates to the microcontroller MC that the condition has arisen in which the current I is zero and, in that condition, the microcontroller MC can interpret the signal supplied by the detector circuit 2 as representative of the back-electromotive force E.

Other methods of acquiring/determining the electromotive force E may, however, be used, without the use of the detector circuit 3.

As described above, the back-electromotive force E can be acquired in the periods of time in which the current I is zero. As will become clearer from the following description, these periods can easily be deduced from an observation of the voltage $V_{TR}$ at the terminals of the triac TR: in fact, if, as an absolute value, $V_{TR}$ is greater than, for example, 1V, then the triac TR is switched off and equation (3) given above applies; otherwise, if $V_{TR}$ is less than 1V, we have I≠0.

In fact, the back-electromotive force E can in principle also be deduced when I≠0 but, in that case, it can be found, for example, by solving the differential equation $$L_W dI/dt = V_W - E - R_W I \quad (4)$$

which is more complex.

It should be noted that, when the current I in the motor M is cancelled out, the triac TR is cut off automatically and the voltage $V_{TR}$ at its terminals changes almost instantaneously from a value of about ±1V to a value which, according to equation (3), is V-E.

The operation of the control system CS according to the invention will now be described.

Starting from the rest state of the motor M, its transition to the steady running state, that is, to the rate of rotation which corresponds to synchronism with the frequency of the supply voltage V is composed substantially of the following successive steps:
- an initial pre-positioning stage to predetermine the direction of rotation of the rotor R,
- a stage for starting rotation in the predetermined direction and acceleration of the rotation to the synchronism condition.

The procedures for the implementation of the control will now be described with particular reference to the graphs of FIGS. 3 to 6, with reference to the individual stages defined above.

Pre-Positioning Stage

As mentioned above, this stage has the purpose of predetermining the direction of rotation of the motor. In this stage, the control must:
- arrange the rotor R in a predetermined angular position $\theta_0$ (FIG. 4), and
- determine the value of the voltage applied to the motor.

The pre-positioning procedure implemented by the microcontroller therefore provides for:
- the selection of the sign or polarity (positive or negative) of the supply voltage V with which to start the procedure; with reference to the graph of FIG. 3, it is assumed that the sign of the voltage V at the start of the procedure is positive;
- when the sign of the voltage V corresponds to the preselected sign (positive in the example illustrated), after a period of time of duration $t_a$ (FIG. 3) from the first positive zero-crossing (that is, from negative to positive) of V, the microcontroller MC drives the triac TR in a manner such as to impart to the motor M a series of $n_a$ current pulses in the same direction; by way of example, the graph of FIG. 3 shows qualitatively the curve of the current I with $n_a=3$ equidirectional pulses but the value of $n_a$ is not limiting.

Upon completion of the pre-positioning stage, that is, upon completion of the $n_a$ current pulses, the rotor R is pre-positioned in a predetermined reference angular position $\theta_0$ (FIG. 4) and the amplitude of the supply voltage V is also known.

For the purposes of the implementation of the above-described pre-positioning stage, the most advantageous sign of V, the duration of the period $t_a$, and the number $n_a$ of current pulses for a specific motor can easily be predetermined experimentally.

Prior to the stage of the initial pre-positioning of the rotor R of the motor, the freely movable state of the rotor may advantageously be checked. With reference to FIG. 5, this can be achieved in the following manner:
once a sign or polarity of the supply voltage V, for example, the positive sign as in FIG. 5, has been preselected, after a period of time of duration $t_a$ from the first positive zero-crossing (that is, from negative values to positive values) of V, the microcontroller MC drives the triac TR in a manner such as to impart to the motor M a series $n_p$ of current pulses in the same direction,
a pulse $I_{test1}$ of the opposite sign (direction) to the preceding pulses is then applied to the motor M with a predetermined delay $t_d$ measured relative to the zero-crossing of the voltage V from positive to negative immediately after the last of the $n_p$ equidirectional pulses (FIG. 5); the amplitude of the pulse $I_{test1}$ and the duration of the delay $t_d$ are selected (in dependence on the amplitude of the supply voltage V) in a manner such as to prevent demagnetization of the rotor R, even in the most unfavourable situation.

If, as a result of the application of the pulse $I_{test1}$ to the motor, the detector circuit 2 detects the development of a back-electromotive force, then the rotor R is clearly free to rotate.

The checking of the freedom of the rotor to rotate may optionally be repeated in the region of the opposite angular position by applying to the motor a further sequence of $n_q$ pulses (FIG. 5) of opposite sign (direction) to the initial $n_p$ pulses (where $n_q$ is preferably equal to $n_p$) and then, after a delay $t_c$ (preferably equal to $t_d$ and measured relative to the zero-crossing of the voltage V from negative to positive immediately after the last of the $n_q$ equidirectional pulses) a further checking pulse $I_{test2}$ of the opposite sign (direction) to $n_q$. If, as a result of the application of the pulse $I_{test2}$ to the motor, the development of an electromotive force in the stator winding W is again detected, then the rotor R is probably free to rotate through the entire 360° range.

Starting Stage

Once the rotor R has been pre-positioned, the direction of the current I in the motor which is necessary to cause the rotor R to start to move in the desired direction is known.

The starting stage is divided into two steps:
- starting of rotation and initial acceleration, and
- final acceleration until the synchronism condition is reached.

The step of starting rotation is implemented in the following manner. In this step, a first current pulse (of the opposite sign or direction to the $n_a$ positioning pulses) indicated I1 in FIG. 6, is applied to the motor M.

This first current pulse I1 starts with a predetermined delay t1 relative to the immediately preceding zero-crossing of the supply voltage V, that is, the preceding transition of the voltage $V_{ZC}$ from level "1" (corresponding, for example, to a voltage of +5V) to level "0".

The first current pulse I1 applied to the stator winding W causes the development of an electromagnetic torque such as to set the rotor in rotation and, as a result, a back-electromotive force E is generated in the winding; the curve of this back-electromotive force E is illustrated qualitatively in the fourth graph of FIG. 6, as a function of the time t given on the abscissa. The absolute value or amplitude of the back-electromotive force E increases initially from the value of zero to a maximum value and then starts to reduce again in the region of the first negative half-wave of the supply voltage V following that in which the current pulse I1 started.

The initial current pulse I1 has the purpose of moving the rotor R from the initial position $\theta_0$, causing its angular velocity to change from the value of zero to a value of approximately half of the synchronism velocity. Thus, for example, if the supply voltage V has a frequency of 50 Hz and the synchronous motor is a two-pole motor, the synchronism velocity in the steady state is 3,000 revolutions/minute and the initial pulse I1 is therefore intended to bring the rotor R to a speed of about 1,500 revolutions/minute.

If the speed reached by the rotor after the first pulse I1 is close to half of the synchronism speed, then the back-electromotive force E will reverse its sign from negative to positive at a moment within the period T of FIG. 6. The moment at which the back-electromotive force E is zero depends on the mechanical inertia of the rotor and of the mechanical load acting thereon and that moment is then considered for the acceleration and synchronization stage.

The subsequent acceleration of the rotor R to the synchronism speed is achieved by applying to the stator winding W a further current pulse, indicated I2 in FIG. 6, having the opposite sign or direction to the first pulse I1. The second pulse I2 is imparted, that is started, during the positive half-wave of the supply voltage V immediately following the positive half-wave in which the first current pulse I1 was completed. The start of the current pulse I2 is delayed, relative to the corresponding positive half-wave of the voltage V by a time t2 (FIG. 6) which depends on the value of the voltage V and on the duration of the period $t_b$ of FIG. 6, in accordance with a relationship that can be predetermined.

In order for the second current pulse I2 to accelerate the rotor R to the synchronism speed, prior to the second pulse I2, the zero-crossing of the back-electromotive force E must take place within a predetermined period of time T (FIG. 6) immediately preceding the third zero-crossing of the supply voltage V (after the start of the pulse I1). This condition is that shown in FIG. 6.

To check that this condition is effectively satisfied, the microcontroller MC is arranged to detect the zero-crossings of the back-electromotive force E on the basis of the signals supplied to it by the detector circuits 2 and 3.

If the check provides a positive outcome, that is, if the back-electromotive force E changes sign or passes through zero within the period T, the microcontroller MC drives the triac TR in a manner such as to bring about the passage of the second current pulse I2 through the winding W. If, on the other hand, the check provides a negative outcome, the microcontroller MC is arranged to interrupt the starting procedure that is in progress and to repeat the procedure from the beginning, starting again from the initial positioning stage, followed by a first current pulse I1 the delay t1 of which relative to the immediately preceding zero-crossing of the voltage V is reduced if the first zero-crossing of the back-electromotive force E took place after the period T in the preceding (aborted) starting procedure; if the first zero-crossing of the back-electromotive force E took place before the period of time T in the preceding starting procedure, on the other hand, the delay t1 of the first current pulse I1 is increased.

If, as a result of the modification of the delay t1 of the first pulse I1, the above-mentioned condition on the zero-crossing of the back-electromotive force E is satisfied, then the microcontroller MC drives the triac TR in a manner such as to apply the second current pulse I2 to the stator winding as described above.

In this case, the triac TR is then driven in a manner such as to bring about the passage through the winding W of an alternating current which is isofrequential with the supply voltage V and which has alternately negative and positive portions, indicated I− and I+ in FIG. 6, separated by periods of predetermined duration t3 (zero or other than zero) in which it remains at zero.

The durations of the delays t1 and t2 are advantageously determined in accordance with respective preset increasing functions of the instantaneous value, detected or calculated, of the supply voltage V. The duration of the second delay t2 is advantageously also determined in accordance with a predetermined function of the delay with which the back-electromotive force E crosses zero for the first time, relative to the immediately preceding zero-crossing of the supply voltage V. This delay is indicated tb in FIG. 6.

The periods t3 for which the current I remains at zero (when they are present) also have a duration which is advantageously a predetermined increasing function of the instantaneous value of the supply voltage V (measured or calculated) and of the load.

Naturally, the principle of the invention remaining the same, the forms of embodiment and details of construction may be varied widely with respect to those described and illustrated purely by way of non-limiting example, without thereby departing from the scope of the invention as defined in the appended claims.

The invention claimed is:

1. A control system (CS), without position sensors, for a synchronous, rotary electric motor (M), comprising:
   an electronic switch (TR) operatively connected in series with a stator winding (W) of the motor (M) between a first terminal and a second terminal (A, B) which are intended to be connected to a supply of an alternating voltage (V),
   first detector means suitable for providing an electrical signal (Vzc) indicative of the sign and of the zero-crossings of the alternating supply voltage (V),
   second detector means suitable for providing signals indicative of the sign and of the zero-crossings of the back-electromotive force which is developed in the stator winding (W) in operation, and
   control means (MC) connected to the electronic switch (TR) and to the first and second detector means and arranged to bring about the starting of the rotation of the rotor (R), starting from a predetermined initial position ($\theta_0$), in accordance with a procedure comprising the steps of:
   a) driving the electronic switch (TR) in a manner such as to bring about the passage through the stator winding (W) of a first current pulse (I1) which starts with a first predetermined delay ($t_1$) relative to the immediately preceding zero-crossing of the supply voltage (V),
   b) checking if the back-electromotive force (E) consequently developed in the stator winding (W) has a first zero-crossing within a predetermined period of time (T) which immediately precedes the third zero-crossing of the supply voltage (V) after the start of the first current pulse (I1), c) when the above-mentioned check provides a positive outcome, driving the electronic switch (TR) in a manner such as to bring about the passage through the stator winding (W) of a second current pulse (I2) of opposite sign or direction to the first (I1), with a second predetermined delay (t2) relative to the third zero-crossing of the supply voltage (V), and then supplying to the winding (W) a voltage at the frequency of the supply, and d) when the check provides a negative outcome, repeating the procedure of step a) given above from the beginning, reducing the duration of the first delay ($t_1$) if the first zero-crossing of the back-electromotive force (E) took place after the period of time (T), and increasing the duration of the first delay (t1) if the first zero-crossing of the back-electromotive force (E) took place before the period of time (T).

2. The control system according to claim 1 in which the control means (MC) are also arranged to drive the electronic switch (TR) in a manner such as to bring about the passage through the stator winding (W), after the second current pulse (I2), of an alternating current which is isofrequential with the supply voltage (V) and which has alternately positive portions (1+) and negative portions (1−) separated by periods of predetermined duration (t3), which may optionally be zero, in which the current remains at zero.

3. The control system according to claim 2 in which the periods in which the current (I) remains at zero have a duration (t3) which is a predetermined increasing function of the instantaneous value, detected or calculated, of the supply voltage (V) and of the load.

4. The control system according to claim 1 in which the first delay (t1) and the second delay (t2) are determined in accordance with predetermined increasing functions of the instantaneous value, detected or calculated, of the supply voltage (V).

5. The control system according to claim 4 in which the second delay (t2) is determined in accordance with a predetermined increasing function of the delay of the first zero-crossing of the electromotive force (E) relative to the immediately preceding zero-crossing of the supply voltage (V).

6. The control system according to claim 1 in which the second detector means comprise a first detector circuit suitable for providing a signal indicative of the voltage ($V_w$) which exists between the terminals of the winding (W) in operation, and a second detector circuit suitable for providing a signal indicative of when the current (I) flowing in the winding is zero.

7. The control system according to claim 1 in which the control means (MC) are also arranged to implement, prior to the starting of the rotation of the rotor (R), a procedure for pre-positioning the rotor (R) in a predetermined initial angular position ($\theta_0$), and in which, at the start of the procedure, the supply voltage (V) is applied with a predetermined initial polarity or sign and then, after a predetermined period of time has elapsed, the electronic switch (TR) is switched on repeatedly a predetermined number of times ($n_a$), each time with a predetermined delay ($t_a$) after the last zero-crossing of the voltage (V) towards the predetermined polarity or sign and whilst the voltage (V) has the predetermined polarity or sign, so that a corresponding number ($n_a$) of current pulses all having the same sign or direction is supplied to the winding (W).

8. The control system according to claim 7 in which the control means (MC) are arranged to implement, prior to the procedure for the pre-positioning of the rotor (R), a procedure or stage for checking that the rotor (R) is free to rotate.

9. The control system according to claim 8 in which, in the procedure or stage for checking that the rotor (R) is free to rotate, the control means (MC) apply to the stator winding (W) a train of ($n_p$) unidirectional current pulses followed by a checking current pulse ($I_{test1}$) of opposite sign or direction to the preceding pulses, with a predetermined delay ($t_d$) relative to the last zero-crossing of the supply voltage (V).

10. The control system according to claim 9 in which, in the procedure or stage for checking that the rotor (R) is free to rotate, after the checking current pulse ($I_{test1}$) the control means (MC) apply to the stator winding (W) a further number ($n_g$) of current pulses having the same sign or direction as the checking pulse ($I_{test1}$) and then, with a further predetermined delay ($t_e$), a final checking pulse ($I_{test2}$) of opposite sign or direction to the first checking pulse ($I_{test1}$).

11. The control system according to claim 9 in which the control means (MC) are arranged to check, by means of the second detector means, whether a back-electromotive force (E) is developed in the stator winding (W) as a result of the checking current pulse/s ($I_{test1}$, $I_{test2}$).

* * * * *